J. T. Raftery,
Windlass Water Elevator.
Nº 85,476. Patented Dec 29, 1868.
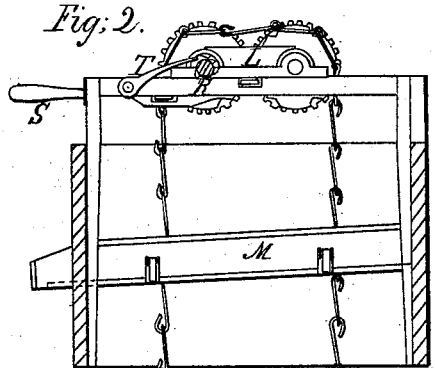
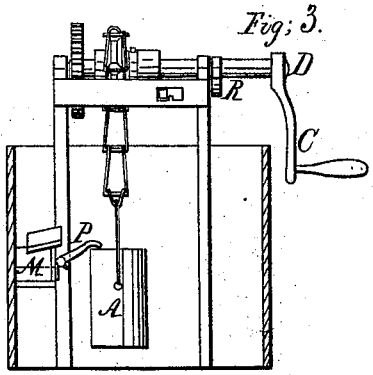
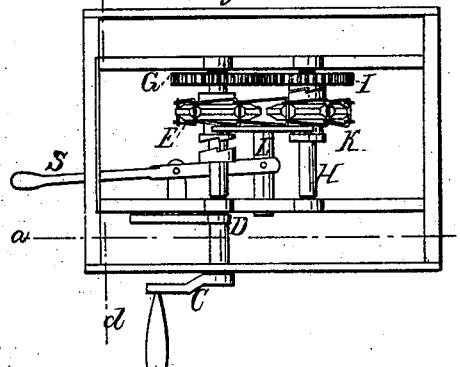
Witnesses.
J. C. Smith
James Y. Smith
Inventor.
John T. Raftery
Chipman Hosmer & Co
Attys.

JOHN T. RAFTERY, OF ELDARA, ILLINOIS.

Letters Patent No. 85,476, dated December 29, 1868.

IMPROVEMENT IN WATER-ELEVATORS.

The Schedule referred to in these Letters Patent and making part of the same.

*To all whom it may concern:*

Be it known that I, JOHN T. RAFTERY, of Eldara, in the county of Pike, and State of Illinois, have invented a new and valuable Improvement in Water-Elevators; and I do hereby declare that the following is a full, clear, and exact description of the construction and operation of the same, reference being had to the annexed drawings, making a part of this specification, and to the letters and figures of reference marked thereon.

The object of my invention is to provide more perfect means than have heretofore been devised for raising water from a well in buckets, and discharging the same into a suitable conduit or trough by one continuous movement of a crank or wheel.

The letters A of the drawings represent the water-buckets, and letter B, the chain attached to the same.

Letter C is a crank connected with the shaft D. This shaft is adjusted in suitable arbors on framework raised above the well-curb, and has arranged upon it, in the manner shown, the fast and loose pinion E and the cog-wheel G.

The pinion E slides back and forth on the shaft by means of a lever, S, as hereinafter mentioned, and it has on its periphery notches or cogs adapted to the links in the chain B. The links of said chain mesh in said notches, and thereby operate to raise the buckets.

Letter H is a shaft adjusted on a line parallel with shaft D, and has arranged upon it also a cog-wheel marked I, which meshes with the cogs of cog-wheel G before mentioned.

The shaft H has likewise attached to it a fast and loose pinion marked K, constructed in all respects like pinion E, save that the fastening and loosening-device is attached to the end opposite the crank, whereas on shaft D the said device is adjusted upon the end nearest the crank.

These fast and loose pinions are connected by a brace, L, as shown on the drawings, and are moved to the right or left, at the operator's will, by means of the lever S.

The letter M shows the trough or conduit into which the water is emptied by the buckets.

My device for emptying the water from the buckets is shown by the letter P.

It consists of a hook attached to the side of the trough, hung with a hinge, whereby it is held at right angles with the trough, at a point directly opposite the bucket, and it is arranged in such manner that it may be moved upward, at will.

When the bucket is drawn upward to the proper point, its rim is brought directly under the end of the hook, and is thereby guided to the trough and emptied.

Whenever one bucket is thus emptied, the operator moves the lever to the right or left, as the case may require, and, without changing the movement of the crank, the bucket emptied passes downward, and the other ascends to its hook to be emptied. This last-named result is accomplished by the fast and loose pinions aforesaid.

The letter R is a ratchet adjusted on shaft D, and letter T is a fall operating therewith.

I am aware that several devices similar to my own have been acted upon by the Patent Office department, but I deny that any one of them combines all the benefits secured by my improvement. I consider it a perfect water-elevator, with very little of complication in its structure or operation.

What I claim as my invention, and desire to secure by Letters Patent, is—

A water-elevator, having shafts D and H, chain B, cog-wheels G and I, fast and loose pinions E and K, brace L, lever S, and hooks P, constructed, arranged, and operating substantially as specified.

In testimony that I claim the above, I have hereunto subscribed my name, in the presence of two witnesses.

JOHN T. RAFTERY.

Witnesses:
M. R. BUTZ,
L. E. EMMONS.